United States Patent
Beal et al.

(10) Patent No.: US 6,616,191 B2
(45) Date of Patent: Sep. 9, 2003

(54) PIPES, BASED ON POLYAMIDE AND POLYOLEFIN, FOR GAS TRANSMISSION AND/OR DISTRIBUTION

(75) Inventors: Jean-Luc Beal, Voisins-le-Bretonneaux (FR); Patrick Dang, Bernay (FR); Olivier Denizart, Millery (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 08/836,522

(22) PCT Filed: Nov. 2, 1995

(86) PCT No.: PCT/FR95/01436

§ 371 (c)(1),
(2), (4) Date: Sep. 22, 1997

(87) PCT Pub. No.: WO96/14531

PCT Pub. Date: May 17, 1996

(65) Prior Publication Data

US 2002/0036405 A1 Mar. 28, 2002

(30) Foreign Application Priority Data

Nov. 2, 1994 (FR) .............................................. 94 13070

(51) Int. Cl.[7] .............................................. F16L 55/00
(52) U.S. Cl. ..................................... 285/21.2; 138/137
(58) Field of Search ................................ 285/423, 915, 285/55, 21.1, 21.2, 21.3; 138/141, 137

(56) References Cited

U.S. PATENT DOCUMENTS

| | | | |
|---|---|---|---|
| 3,561,493 A | | 2/1971 | Maillard |
| 3,920,268 A | * | 11/1975 | Stewig ....................... 285/21.1 |
| 3,920,787 A | * | 11/1975 | McDowell et al. ..... 285/21.1 X |
| 4,611,833 A | | 9/1986 | Lescaut |
| 4,614,208 A | * | 9/1986 | Skarelius |
| 4,804,209 A | * | 2/1989 | Fischer ..................... 285/915 X |
| 4,927,184 A | * | 5/1990 | Bourjot et al. ............. 285/21.1 |
| 4,954,016 A | * | 9/1990 | Storgard .................... 285/55 X |
| 5,076,329 A | * | 12/1991 | Brunnhofer .................. 138/137 |
| 5,219,002 A | * | 6/1993 | Stenger et al. |
| 5,330,810 A | * | 7/1994 | Nishino |
| 5,342,886 A | | 8/1994 | Glotin et al. |
| 5,354,100 A | * | 10/1994 | Wall et al. ................. 285/21.1 |
| 5,390,705 A | * | 2/1995 | Brunnhofer |
| 5,404,915 A | * | 4/1995 | Mugge et al. |
| 5,411,060 A | * | 5/1995 | Chandler |
| 5,425,817 A | * | 6/1995 | Mugge et al. |
| 5,472,754 A | * | 12/1995 | Douchet et al. ......... 428/36.91 |
| 5,474,109 A | * | 12/1995 | Stoeppelmann et al. .... 138/137 |
| 5,476,120 A | * | 12/1995 | Brunnhofer |

(List continued on next page.)

FOREIGN PATENT DOCUMENTS

| | | | |
|---|---|---|---|
| DE | 3821723 | * | 9/1989 |
| EP | 45757 | | 9/1981 |
| EP | 204445 | | 6/1989 |
| EP | 342066 | | 11/1989 |
| EP | 445181 | | 9/1991 |
| FR | 2291225 | | 6/1976 |
| FR | 2564938 | | 11/1985 |
| FR | 2701303 | | 8/1994 |
| GB | 2038444 | | 7/1980 |

*Primary Examiner*—Gary Estremsky
(74) *Attorney, Agent, or Firm*—Smith, Gambrell & Russell, LLP

(57) ABSTRACT

The present invention relates to pipes for the transmission and/or distribution of combustible gases, and liquefied gases, comprising a polyethylene layer and a polyamide inside and/or outside layer. These pipes may advantageously be connected together by adhesively bonded sleeves and thus form medium-pressure and low-pressure gas distribution and transmission networks or else they may be installed inside already existing metal pipes.

These pipes may be manufactured by coextrusion.

23 Claims, 1 Drawing Sheet

U.S. PATENT DOCUMENTS

| | | | |
|---|---|---|---|
| 5,549,943 A | * 8/1996 | Vicik | 428/34.8 |
| 5,554,426 A | * 9/1996 | Rober et al. | |
| 5,560,398 A | * 10/1996 | Pfleger | 138/121 |
| 5,570,711 A | * 11/1996 | Walsh | |
| 5,588,468 A | * 12/1996 | Pfleger | 138/121 |
| 5,622,210 A | * 4/1997 | Crisman et al. | |
| 5,743,304 A | * 4/1998 | Mitchell et al. | |
| 5,775,378 A | * 7/1998 | Auvil et al. | 285/21.14 |
| 5,792,532 A | * 8/1998 | Pfleger | 428/36.9 |
| 5,799,704 A | * 9/1998 | Andre | |
| 5,850,855 A | * 12/1998 | Kerschbaumer et al. | 138/137 |
| 5,921,587 A | * 7/1999 | Lueghamer | 285/21.1 |
| 5,932,306 A | * 8/1999 | Usui | 428/35.9 |
| 6,135,508 A | * 10/2000 | Genoni et al. | 285/21.1 |
| 6,177,162 B1 | * 1/2001 | Siour et al. | 428/36.91 |

\* cited by examiner

PIPES, BASED ON POLYAMIDE AND POLYOLEFIN, FOR GAS TRANSMISSION AND/OR DISTRIBUTION

FIELD OF THE INVENTION

The present invention relates to pipes, based on polyamide (PA) and polyolefin (PO) for gas distribution, especially for combustible gases such as natural gas, air-propane mixtures and liquefied petroleum gas (LPG) and preferably natural gas, and, more precisely, pipes comprising at least one layer of polyamide and at least one layer of polyethylene. These pipes are particularly used for medium-pressure and low-pressure distribution networks, i.e. operating at pressures between 2 kPa and 1 MPa, which distribute the gas to private dwellings and to blocks of flats.

BACKGROUND OF THE INVENTION

For this application, pipes made of polyamide (PA), mainly nylon-11, are known, as are pipes made of medium-density and high-density polyethylene of the MRS80 (PE80) and MRS100 (PE100) types in the sense of the ISO/DIS12162 standard—"Thermoplastics for applications as pipes and fittings: Classification & Designation". These pipes made of thermoplastic resin are used either for installing new distribution networks or for renovating existing networks consisting of metal (steel and cast iron) pipes by inserting these thermoplastic pipes into already installed metal pipes, or for replacing all or part of the thermoplastic pipes inserted into metal pipes.

Some of the mechanical properties of PA are superior to those of PE, among which may be mentioned the elastic modulus and the stress at the yield point, the instantaneous burst strength, the strain at the yield point and the offset yield stress, the resistance to creep under load and the temperature withstand performance. In contrast, the impact strength of PA is less than that of PE.

In addition to the mechanical properties indicated above and especially the creep resistance, three other important parameters should be considered, namely the long-term burst pressure, the ability to be wound on a reel or the reelability (an important parameter in storing and transporting pipes) and the chemical resistance.

Since the long-term burst pressure of a pipe correlates with the tensile properties of its constituent materials and with its creep resistance, the burst pressure of PA is superior to that of PE (for identical pipe configurations). For gas transmission and/or distribution pipes, this property is measured for a minimum lifetime of 50 years. The 50-year strength called LTHS (Long-Term Hydrostatic Strength) and the minimum 50-year strength called MRS (Minimum Required Strength) are measured according to the ISO/DTR9080 and AS 2943 and 2944 standards. For the nylon-11 marketed by the Applicant under the name RILSAN® BESN Yellow 41 TL (or hereinafter, more succinctly, Yellow nylon-11), LTHS=15 MPa; for PE 80 marketed under the name FINATHENE® black PE3802, LTHS=8 MPa; for PE 100 marketed under the name ELTEX® TU B121, LTHS=10 MPa.

Each pipe may be sized according to the burst pressure of the constituent material of the pipe, to the service pressure of the pipe (and to a safety factor). Taking 2 pipes (one made of PA and the other of PE) of the same external diameter, the SDR (Standard Dimensional Ratio=outside diameter/thickness) of the PA pipe is superior to that of the PE pipe. Thus, for a service pressure of 300 kPA (with a safety factor of 3), the SDR of the PE80 pipe is equal to 17.6 whereas that of the Yellow nylon-11 pipe is 33.

In order to assess the ability of a pipe to be wound onto a reel or its reelability, a strain is imposed on it which tends to ovalise it. This strain depends not only on the geometry of the pipe and the diameter of the reeling spindle, but also on the elastic properties of the material (in fact, if it is desired for the pipe, once unreeled, to become circular again, there should be no plastic deformation).

PA pipes are superior to PE pipes when the limiting elastic stress of each of the two materials, as well as their minimum reeling diameters, are taken into account.

The table below shows the minimum reeling diameter for pipes of various external (or outside) and internal (or inside) diameters made, on the one hand, of yellow nylon-11 with an SDR=17 and, on the other hand, of PE80 (FINATHENE® PE3802) with an SDR=11.

| Pipe type | EXTERNAL φ (mm) | THICKNESS (mm) | INTERNAL φ (mm) | REELING φ (mm) |
|---|---|---|---|---|
| Nylon-11 | 29.5 | 1.75 | 26 | 1400 |
| Nylon-11 | 37 | 2.2 | 32.6 | 1500 |
| Nylon-11 | 58.2 | 3.4 | 51.4 | 6000 |
| PE80 | 32 | 3 | 26 | 650 |
| PE80 | 40 | 3.7 | 32.6 | 800 |
| PE80 | 63 | 5.8 | 51.4 | 1300 |

The pipes made of PA, being stronger than those made of PE, require less material but they reel poorly. They are particularly suited for straight portions; in contrast, more fittings are required for non-straight portions. But when the outside diameter of the pipe is imposed, for example in a case where it has to be inserted into metal pipes of an existing network, the inside diameter of a PA pipe for conveying gas will be greater than that of a PE pipe.

The chemical resistance of PA, in particular of nylon-11, to aromatic and chlorinated hydrocarbon compounds and to acids and bases is superior to that of PE. By way of example, as a comparison of the resistance of Yellow nylon-11 and PE80 immersed in a synthetic solution of natural gas condensates (a 10/20/25/25/10/10 benzene/toluene/xylene/cyclohexane/kerosene/styrene mixture, the proportions being by volume) for 72 hours gives the following results:

|  | Nylon-11 | PE80 |
|---|---|---|
| Weight increase (%) | 7.2 | 7.5 |
| Length increase (%) | 0.9 | 2.5 |
| Diameter increase (%) | 0.5 | 2.4 |
| Variation in resistance to pressure (%) | −10.4 | −30.1 |

BRIEF DESCRIPTION OF THE DRAWING

The figures of the drawing are non-limiting examples comprising a conduit having an inside and outside layer, optionally having a tie layer therebetween (FIG. 1) and having three layers with tie layers therebetween (FIG. 2).

DESCRIPTION OF THE INVENTION

Figure 1:
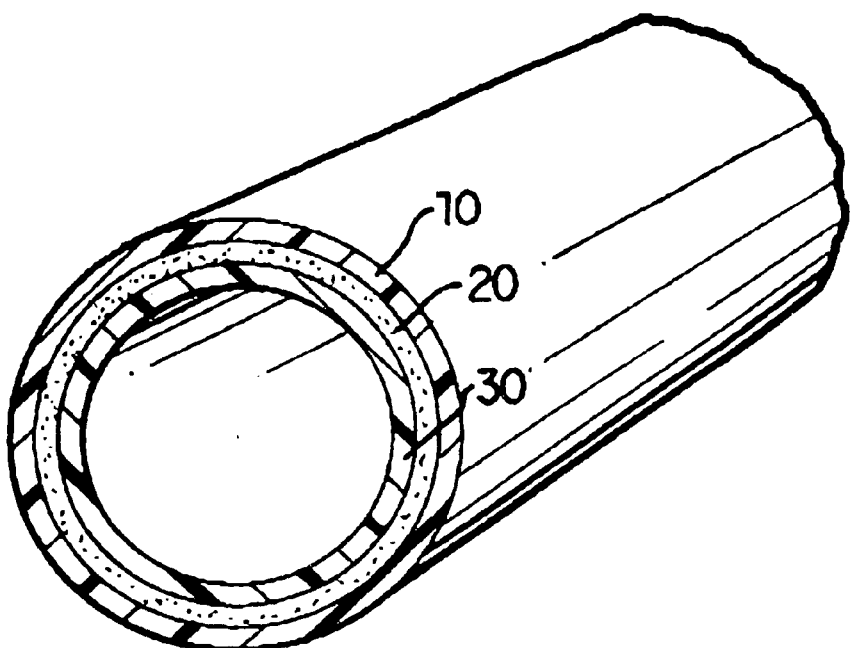
Figure 2:
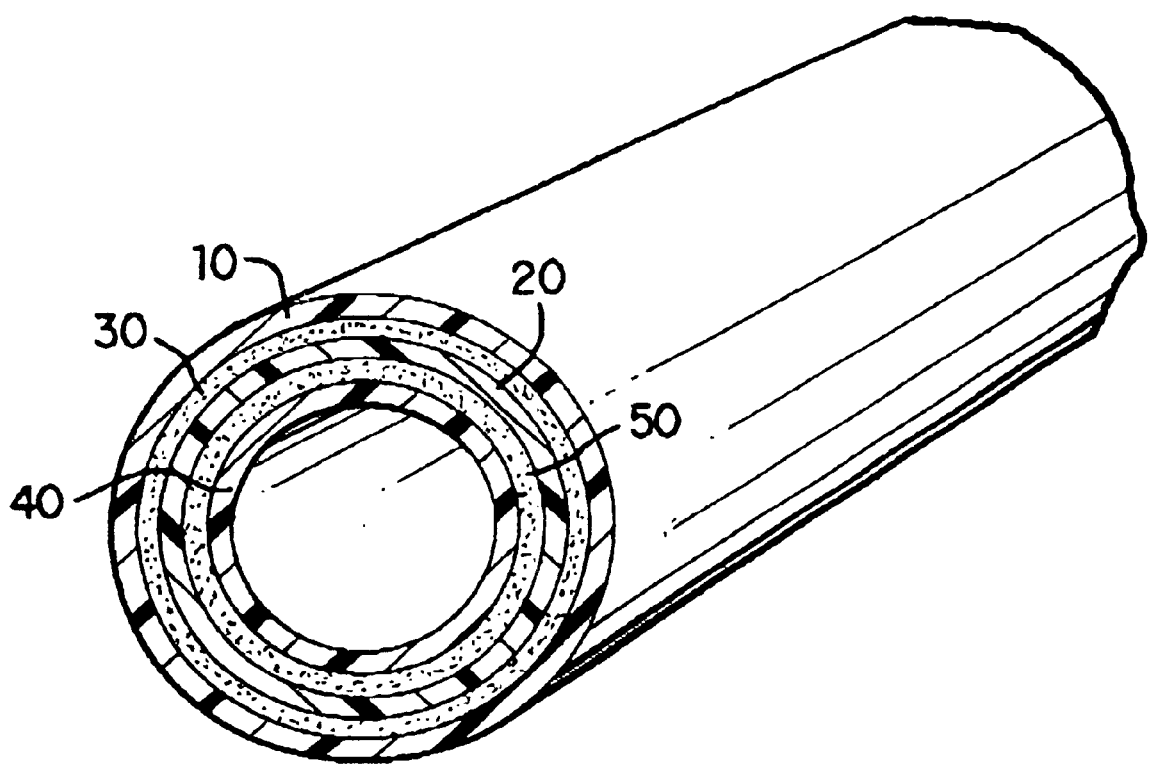

The Applicant has developed, for gas transmission and/or distribution, pipes which have simultaneously the advantages of PA and of PE without having the drawbacks of these two materials. One advantage of the pipes implemented according to the invention is that there is a good compromise between the resistance to pressure, provided by the PA layer, and the ease of reeling, provided by the PE layer.

A first subject of the invention relates to the use of pipes, for gas transmission and/or distribution, essentially consisting of polyolefin and comprising an outside layer of PA.

By polyolefin or PO is understood to mean homopolymers and copolymers of ethylene, for example copolymers of ethylene and other α-olefins, copolymers of ethylene and one or more esters of unsaturated carboxylic acids, such as alkyl (meth)acrylates or the copolymers of ethylene and vinyl derivatives of saturated carboxylic acids, such as vinyl acetate, (or, more succinctly, PE), or polypropylene, these being alone or as a blend, and possibly crosslinked by peroxides or silanes. Among the preferred POs, mention may be made of PE, as defined hereinabove, and more particularly the copolymers of ethylene and butene and the copolymers of ethylene and hexene, such as black FINA-THENE® PE3802 and ELTEX® TU B 121 respectively, especially because of their long-term pressure resistance and crack-propagation resistance properties.

The thickness of the PO layer depends on the mechanical stresses and it may, in general, vary from 0.5 mm to 30 mm for pipes having an outside diameter up to 300 mm.

"Essentially consisting of PO" means that most of the pressure resistance is due to the PO.

By PA is understood to mean the polymers and copolymers, which contain amide bonds in their chains and which may be obtained especially by polycondensation. By way of example of PA, mention may be made of nylon-6, nylon-4,6, nylon-11, nylon-12, nylon-6,12, nylon-12,12, as well as PA-based thermoplastic elastomers, by themselves, as blends and/or copolymerized. By PA is also meant blends of PA and polyolefin(s) having a polyamide matrix, i.e. blends in which the polyolefin or polyolefins are dispersed in this polyamide matrix, these polyolefins being as defined previously. The quantity of polyamide forming the matrix is in general between 55 and 95 parts by weight for from 5 to 45 parts of polyolefin.

The polyolefins used are advantageously chosen from:
polyethylene and copolymers of ethylene and α-olefin;
copolymers of ethylene and at least one alkyl (meth) acrylate;
copolymers of ethylene, at least one alkyl (meth)acrylate and maleic anhydride, the maleic anhydride being grafted or copolymerized
copolymers of ethylene, at least one alkyl (meth)acrylate and glycidyl methacrylate (GLYMA), the GLYMA being grafted or copolymerized;
polypropylene.

In order to make it easier to form the polyamide matrix and if the polyolefins have few or no functional groups able to facilitate compatibilisation, it is recommended to add a compatibilising agent.

By way of example of a compatibilising agent, mention may be made of:
ethylene/(meth)acrylic acid copolymers, optionally neutralised;
polyethylene, polypropylene, ethylene-propylene copolymers and copolymers of ethylene and an alpha-olefin, all these substances being grafted by maleic anhydride (MA) or by glycidyl methacrylate;
ethylene/alkyl (meth)acrylate/MA copolymers, the MA being grafted or copolymerized;

ethylene/vinyl acetate/MA copolymers, the maleic anhydride being grafted or copolymerized;
the two preceding copolymers in which maleic anhydride is replaced by GLYMA;
polyethylene, polypropylene or ethylene/propylene copolymers, these copolymers being grafted by a substance having a site which reacts with amines and then undergoing condensation with polyamides or oligoamides having a single amine terminal group.

These substances are especially described in Patents FR-2,291,225 and EP-342,066.

The quantity of compatibiliser is the quantity sufficient for the PO to be dispersed in the form of nodules in the polyamide matrix. It may represent up to 20% of the weight of polyolefin(s). These blends of polyamide, polyolefin(s) and, optionally, compatibiliser are manufactured using the usual mixing techniques.

In the case of polypropylene, a compatibiliser is added which is advantageously an ethylene-propylene copolymer having mostly propylene units, this being grafted by maleic anhydride, and then undergoing condensation with monoaminated oligomers of caprolactam. Such blends of polyamide and polypropylene are described in Patent U.S. Pat. No. 5,342,886.

Among PAs, it is preferable to use nylon-12 and nylon-11 having an intrinsic viscosity in metacresol of between 1.3 and 1.6. The thickness of the PA layer, which depends on the mechanical stresses, is in general between 50 µm and 3 mm.

According to a first subject of the invention, the pipe produced comprises a PA outside layer 10 and one or more layers of PO 20, preferably of PE. It is judicious to arrange a tie layer 30 between the PA and the adjacent PO layer. According to a preferred form, the pipe consists, in succession, of a PA layer, a tie layer and a PO inside layer.

By tie material is meant any substance enabling the PA to adhere to the PO. It is possible to use any of the known tie materials for coextruding polyamides and polyolefins.

By way of examples of tie materials, mention may be made of:
polyethylene, polypropylene, copolymers of ethylene and at leat one α-olefin, blends of these polymers, grafted by anhydrides of unsaturated carboxylic acids, such as maleic anhydride, or unsaturated epoxides such as glycidyl methacrylate;
copolymers of ethylene with at least one substance chosen from (i) unsaturated carboxylic acids, their salts and their esters, (ii) vinyl esters of saturated carboxylic acids, (iii) unsaturated dicarboxylic acids, their salts, their esters, their monoesters and their anhydrides and (iv) unsaturated epoxides, the monomers (i) to (iv) being grafted or copolymerized.

It is also possible to use blends of these grafted polymers with ungrafted polymers.

By way of examples of particularly advantageous tie materials, mention may be made of:
polyethylene, polypropylene or copolymers of ethylene and at least one α-olefin, these being grafted by maleic anhydride and optionally blended with other copolymers of ethylene and propylene;
copolymers of ethylene and an alkyl (meth)acrylate or vinyl acetate, these being grafted or copolymerized with maleic anhydride or glycidyl (meth)acrylate and optionally blended with polyethylene or ethylene copolymers;
copolymers of ethylene and (meth)acrylic acid partially neutralised by metals.

The thickness of the tie layer is in general between 5 and 150 μm.

According to a second advantageous form of the first subject of the invention, the pipe comprises a PA external layer and a PE internal layer and it is characterized in that at least one of the two layers contains a substance which allows adhesion of the PA to the PO. This substance may be, for example, one or more of the tie materials described above. According to this second advantageous form, it is sufficient to blend it with the PA or with the PO, but it is preferable to incorporate it with the PA.

In general, the pipes of the invention have outside diameters of from 12 to 300 mm. The thickness of the PA outside layer is advantageously between 200 μm and a few mm, and is preferably between 250 μm and 1 mm.

Listed below are the burst pressures at 23° C. of pipes having various thicknesses, produced from Yellow nylon-11 and an MDPE marketed under the name FINATHENE® PE3802 (Table 1) and produced from nylon-12 marketed under the name RILSAN® AESNO TL and a HDPE, LACQTENE® 1002 TN22 (Table 2); for each of the pipes tested, the PA and PE layers are connected via an adhesion tie layer of approximately 100 μm which is a HDPE copolymer modified especially by maleic anhydride grafting (having a density of 0.939 g/cm$^3$ and a Melt Index=0.2 g/10 min, measured according to the ASTM D1238 standard at 190° C. with a load of 2.16 kg) marketed by the applicant under the name OREVAC® 18501.

TABLE 1

| FINATHENE PE (thickness in mm) | Yellow nylon-11 (thickness in mm) | Burst pressure (MPa) |
| --- | --- | --- |
| 0 | 3 | 8.8 |
| 1.675 | 1.475 | 6.9 |
| 2.1 | 1.025 | 6.3 |
| 2.55 | 0.525 | 5.6 |
| 3 | 0 | 4.9 | nylon-11/tie material/HDPE tubes - internal and external diameters: 26 and 33 mm

TABLE 2

| LACQTENE PE (thickness in mm) | AESNOTL nylon-12 (thickness in mm) | Burst pressure (MPa) |
| --- | --- | --- |
| 0 | 5.7 | 9.3 |
| 4.7 | 1 | 5.4 |
| 5.7 | 0 | 4.7 | nylon-12/tie material/HDPE tubes - 63 mm external diameter, SDR = 11

In Table 3, the reeling force necessary to impose a radius of curvature of 535 mm on PA, PE and PA/tie material/PE pipes having a 32 mm outside diameter and an SDR=11 (32×3) are compared.

The pipe according to the invention consists of a 0.5 mm thick PA outside layer, a 0.1 mm tie layer and a 2.4 mm thick PE layer.

TABLE 3

| Pipe type | Reeling force (N) |
| --- | --- |
| PA | 915 |
| PE80 | 385 |
| PA ext/tie material/PE int | 425 |

Using the pipes according to the invention, it is therefore possible to establish longer lengths and to limit, or indeed dispense with, the fittings. Although it is possible to use any type of fitting, such as, for example those described in EP 457,57 and EP 204,445, it is preferred to use adhesively bonded sleeves. In this case, a PA tube is used whose inside diameter is essentially the same as the outside diameter of the pipes to be connected and whose length is, for example, between 0.04 and 0.5 m. Particularly suitable adhesives have been described in EP 445,181. PE pipes of the prior art can be connected only by butt fusion or by electrofusion-weldable sleeves. Butt fusion is difficult to employ in the field, more particularly for small diameters. Electrofusion-weldable sleeves are tubes having an inside diameter substantially equal to the outside diameter of the pipes to be connected. Electrical resistance elements are embedded in these sleeves and a current source is sufficient to cause fusion and welding. The drawback of electrofusion-weldable sleeves is the additional thickness which they produce compared to the external diameter of the pipe proper, especially when these welded pipes are slid into the pipes of an existing network. The thick sleeves necessitate using gas pipes having a smaller outside diameter and therefore ultimately a smaller internal diameter, which ultimately limits the flow rate of gas in the pipe. The adhesively bonded PA sleeves have a small thickness and therefore take up very much less room than the electrofusion-weldable sleeves. They are particularly suitable for renovating already existing gas networks. In fact, in this type of use where the outside diameter of the pipes is strictly limited, it is possible to use pipes based on PA and PO of the invention having a larger diameter than PE pipes of the prior art. By way of example, for a pipe having a 32 mm external diameter with a PA external layer according to the invention, an adhesively bonded sleeve made of 3 mm PA is suitable whereas, for a PE pipe having the same external diameter, a 4.5 mm electrofusion-weldable sleeve is necessary. For a pipe having a 63 mm external diameter with a PA external layer according to the invention, an adhesively bonded sleeve made of 4.5 mm PA is suitable whereas, for a PE pipe having the same external diameter, a 9 mm electrofusion-weldable sleeve is necessary.

The pipes according to the invention which have a PA external layer are less sensitive to the scratches which may, for example, occur during storage, transportation or on-site installation operations than PE pipes. Now, scratches are often the origin of fracture initiation. A test derived from the method of the PENT test of Dr. N. Brown—Univ. of Pennsylvannia shows that Yellow nylon-11 exhibits no crack propagation at 80° C. at 7.4 MPa after 10,000 minutes.

It proves to be the case that PO, and especially PE, is highly plasticised by liquefied gas, such as LPG, butane, propane, or the condensates which may appear in the gas, whereas PA resists these liquids very well. Plasticization of a resin leads to a drop in its mechanical properties.

A second subject of the invention therefore relates to the use of pipes essentially consisting of PE and comprising a PA inside layer for liquefied-gas transmission and/or distribution, the PA and PO being defined as above. According to one advantageous form of the invention, the pipe consists of a PA internal layer and one or more PO layers. A tie layer is preferably arranged between the PA and the adjacent PO layer, the tie material being as defined above. According to this preferred form, the pipe consists, in succession, of a PO, preferably PE, outside layer, a tie layer and a PA inside layer. According to a second preferred form of the second subject of the invention, the pipe consists of a PO, pref. PE, outside layer and a PA inside layer, and at least one of the two layers contains a substance which allows them to adhere, such as the tie material defined above. The substance allowing adhesion of the PA to the PO is preferably incorporated into the PA layer.

Although not having the advantages of the pipes according to the invention which have a PA outside layer and a PO inside layer, they do nevertheless have the advantage, compared to PE pipes, of resisting liquefied gases and gas condensates and of being less permeable to methane, the main compound in natural gas.

The $CH_4$ permeability of nylon-11 is 0.0022 mm$^3$/day/atm, that of PE80 is 0.07 mm$^3$/day/atm and that of a PE80/tie material/nylon-11 tube (having thicknesses of 0.5/0.1/2.4 mm) is 0.011 mm$^3$/day/atm.

A third subject of the present invention relates to gas pipes essentially consisting of PO and comprising a PA outside layer 40 and a PA inside layer, the PA and PO, and preferably the PE, being as defined above. According to a preferred form of the third subject of the invention, a tie layer 20 and 50 is arranged between the PO layer and the adjacent PA layers, the tie material being as defined above. According to a second preferred form of the third subject of the invention, the pipe consists of a PA outside layer, a PO layer and a PA inside layer, the PA layers and/or the PO layer containing a substance which allows their adhesion to the other layers, this substance being as defined above and preferably incorporated into the PA layers. It would not be outside the scope of the invention to combine the two preferred forms of the third subject of the invention, for example by incorporating a substance allowing adhesion into the PA outside layer and by using a tie layer between the PO layer and the PA inside layer or vice versa.

The subject of the invention is also the process for manufacturing the pipes described hereinabove. It consists in coextruding the various layers simultaneously. In particular, the particularly preferred pipe having 5 layers, PA/tie material/PE/tie material/PA, in which the 2 PA layers have the same composition, is produced by coextrusion using only 3 flow-dividing extruders.

Although the invention has been described in conjunction with specific embodiments, it is evident that many alternatives and variations will be apparent to those skilled in the art in light of the foregoing description. Accordingly, the invention A is intended to embrace all of the alternatives and variations that fall within the spirit and scope of the appended claims. The above references are hereby incorporated by reference.

What is claimed is:

1. A conduit consisting essentially of a polyolefin inner layer adhered to a polyamide outer layer, and excluding a polyester layer, wherein the polyamide layer contains a substance promoting adhesion of the layers, said substance being selected from the group consisting of polyethylene, polypropylene, copolymers of ethylene and at least one ∀-olefin, blends of these polymers, grafted by anhydrides of unsaturated carboxylic acid, or unsaturated epoxides; copolymers of ethylene with at least one substance chosen from (i) unsaturated carboxylic acids, their salts and their esters, (ii) vinyl esters of saturated carboxylic acids, (iii) unsaturated dicarboxylic acids, their salts, their esters, their monoesters and their anhydrides and (iv) unsaturated epoxides, the monomers (i) to (iv) being grafted and blends of these graphed polymers with ungrafted polymers.

2. The conduit according to claim 1, wherein a tie layer adheres the polyamide layer to the polyolefin layer.

3. A process for renovating a gas distribution network of pipes, comprising:
   inserting the conduit according to claim 2 into the network of pipes; and
   connecting the conduit with another conduit using a member selected from the group consisting of an electrofusion-weldable sleeve and an adhesively bonded sleeve.

4. A process for manufacturing the conduit described in claim 2, comprising coextruding the layers simultaneously by coextrusion.

5. A method of gas distribution in pipes, consisting essentially of transmitting gas in the conduit according to claim 2.

6. The conduit according to claim 2, wherein the unsaturated carboxylic acid is maleic anhydride and the unsaturated epoxide is glycidyl methacrylate.

7. A process for renovating a gas distribution network of pipes, comprising:
   inserting the conduit according to claim 1 into the network of pipes; and
   connecting the conduit with another conduit using a member selected from the group consisting of an electrofusion-weldable sleeve and an adhesively bonded sleeve.

8. A process for manufacturing the conduit described in claim 1, comprising coextruding the layers simultaneously by coextrusion.

9. A method of gas distribution in pipes, consisting essentially of transmitting gas in the conduit according to claim 1.

10. The conduit according to claim 1, wherein the polyolefin is polyethylene.

11. A conduit consisting essentially of polyolefin adhered to a polyamide inner layer and a polyamide outer layer, and excluding a polyester layer, wherein one or both of the polyamide inner layer and polyamide outer layer contains a substance promoting adhesion of the polyolefin and the inner and/or outer polyamide layer, said substance being selected from the group consisting of polyethylene, polypropylene, copolymers of ethylene and at least one ∀-olefin, blends of these polymers, grafted by anhydrides of unsaturated carboxylic acid, or unsaturated epoxides; copolymers of ethylene with at least one substance chosen from (i) unsaturated carboxylic acids, their salts and their esters, (ii) vinyl esters of saturated carboxylic acids, (iii) unsaturated dicarboxylic acids, their salts, their esters, their monoesters and their anhydrides and (iv) unsaturated epoxides, the monomers (i) to (iv) being grafted and blends of these graphed polymers with ungrafted polymers.

12. A conduit according to claim 11, wherein a tie layer adheres at least one polyamide layer to the polyolefin.

13. A process for renovating a gas distribution network of pipes, comprising:
   inserting the conduit according to claim 12 into the network of pipes;
   connecting the conduit with another conduit using a member selected from the group consisting of an electrofusion-weldable sleeve and an adhesively bonded sleeve.

14. A process for manufacturing the conduit described in claim 12, comprising coextruding the layers simultaneously by coextrusion.

15. A method of gas distribution in pipes, consisting essentially of transmitting gas in the conduit according to claim 12.

16. The conduit according to claim 12, wherein the unsaturated carboxylic acid is maleic anhydride and the unsaturated epoxide is glycidyl methacrylate.

17. A process for renovating a gas distribution network of pipes, comprising:

inserting the conduit according to claim 11 into the network of pipes; and connecting the conduit with another conduit using a member selected from the group consisting of an electrofusion-weldable sleeve and an adhesively bonded sleeve.

18. A process for manufacturing the conduit described in claim 11, comprising coextruding the layers simultaneously by coextrusion.

19. A method of gas distribution in pipes, consisting essentially of transmitting gas in the conduit according to claim 11.

20. A method for liquified-gas distribution or transmission in pipes, consisting essentially of transmitting liquified gas in a conduit having a polyolefin layer adhered to a polyamide inside layer, and excluding a polyester layer.

21. A method for gas distribution or transmission in pipes, consisting essentially of transmitting gas in a conduit having a polyolefin layer adhered to a polyamide inside layer and polyamide outside layer, and excluding a polyester layer, wherein one or both of the polyamide inside layer and polyamide outside layer contains a substance promoting adhesion of the polyolefin layer and the inside and/or outside polyamide layer, said substance being selected from the group consisting of polyethylene, polypropylene, copolymers of ethylene and at least one ∀-olefin, blends of these polymers, grafted by anhydrides of unsaturated carboxylic acid, or unsaturated epoxides; copolymers of ethylene with at least one substance chosen from (i) unsaturated carboxylic acids, their salts and their esters, (ii) vinyl esters of saturated carboxylic acids, (iii) unsaturated dicarboxylic acids, their salts, their esters, their monoesters and their anhydrides and (iv) unsaturated epoxides, the monomers (i) to (iv) being grafted and blends of these graphed polymers with ungrafted polymers.

22. A conduit comprising three layers including a polyamide outer layer, a polyolefin inner layer and a tie-layer between, wherein said conduit requires a reeling force of less than or equal to 425 N to impose a radius of curvature of 535 nm, further wherein the polyamide layer contains a substance promoting adhesion of the polyamide and polyolefin layers, said substance being selected from the group consisting of polyethylene, polypropylene, copolymers of ethylene and at least one ∀-olefin, blends of these polymers, grafted by anhydrides of unsaturated carboxylic acid, or unsaturated epoxides; copolymers of ethylene with at least one substance chosen from (i) unsaturated carboxylic acids, their salts and their esters, (ii) vinyl esters of saturated carboxylic acids, anhydrides and (iv) unsaturated epoxides, the monomers (i) to (iv) being grafted and (iii) unsaturated dicarboxylic acids, their salts, their esters, their monoesters and their anhydrides and (iv) unsaturated epoxides, the monomers (i) to (iv) being grafted and blends of these graphed polymers with ungrafted polymers.

23. The conduit according to claim 22, wherein the polyamide outer layer has a thickness less than or equal to 0.5 mm, the polyolefin inner layer has a thickness less than or equal to 2.4 mm, and the tie-layer between has a thickness less than or equal to 0.1 mm.

* * * * *